Patented Mar. 27, 1951

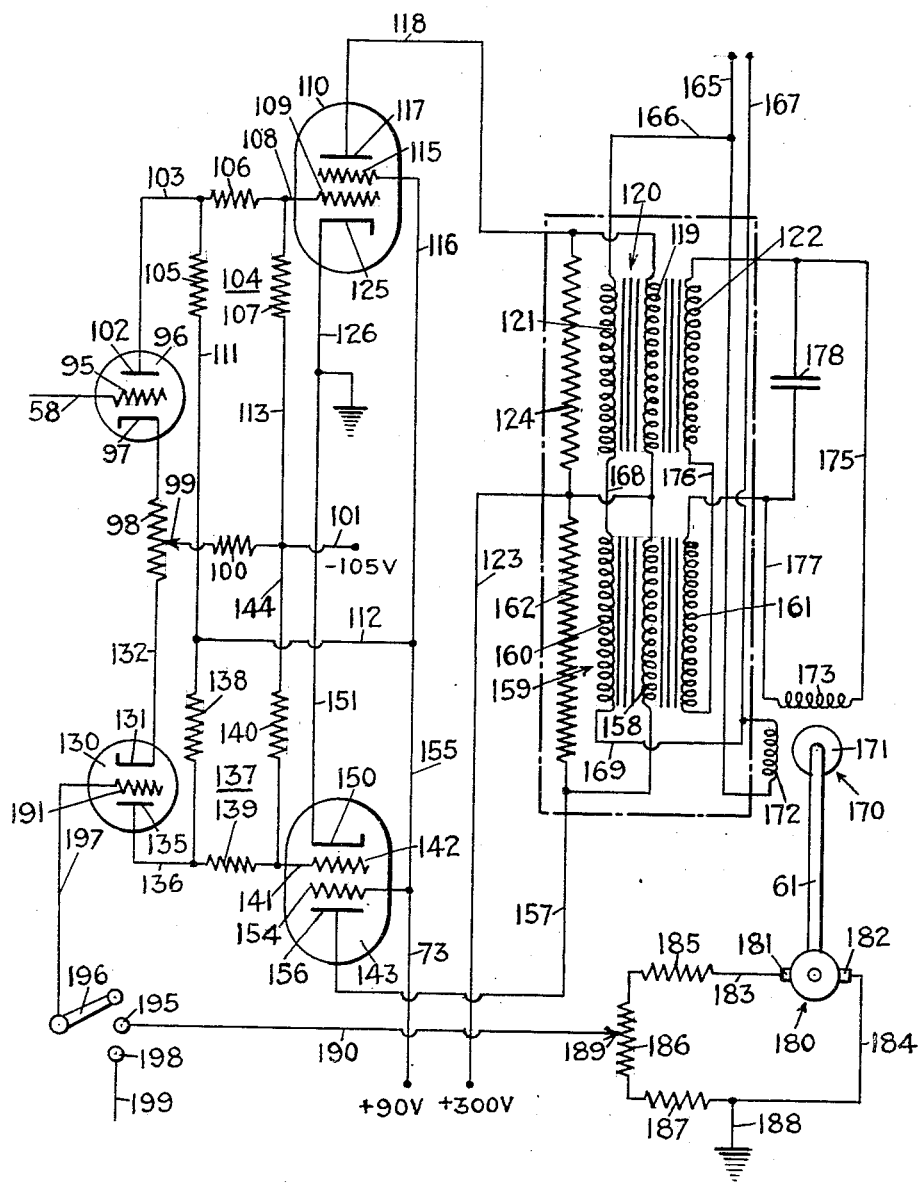

2,546,271

UNITED STATES PATENT OFFICE 2,546,271

MOTOR CONTROL SYSTEM

Henry F. McKenney, Flushing, and William H. Newell, New York, N. Y., assignors to The Sperry Corporation, a corporation of Delaware Original application November 22, 1946, Serial No. 711,616. Divided and this application December 21, 1946, Serial No. 717,718

1 Claim. (Cl. 318—257)

This invention relates to a motor control system and more particularly to a system for controlling a reversible induction motor by means of saturable core transformers having saturating windings which are energized in response to a control signal.

This application is a division of our copending application Serial No. 711,616, filed November 22, 1946, for Registering Device.

An object of the invention is to provide a sensitive control system of the above type wherein an induction motor is accurately controlled in response to a comparatively small input signal.

Another object is to provide a system of the above type wherein the direction and speed of rotation of the motor are varied as a function of the input signal.

Another object is to provide a system of the above type including an electric follow-up circuit which is arranged to cause the motor to operate at a speed which is proportional to the amplitude of the input signal.

Various other objects and advantages will be apparent as the nature of the invention is more fully disclosed.

Although the novel features which are characteristic of this invention are pointed out more particularly in the claim, the nature of the invention will be better understood by referring to the following description, taken in connection with the accompanying drawing in which a specific embodiment thereof has been set forth for purposes of illustration.

In the drawing:

The figure is a schematic diagram of a circuit embodying the present invention.

In accordance with the present invention the motor control circuit includes an amplifier system which is connected to control the operation of a pair of saturable core transformers, the outputs of which are connected in opposition to the control winding of an induction motor. A feed-back generator capable of producing a voltage which is a function of its speed is driven by the induction motor. The amplifier system includes an inverter stage comprising a pair of tubes with their cathodes coupled by a biasing resistor in such a manner that their plate currents vary in opposite sense. The control signal is applied to the grid of one of the inverter tubes and the signal derived from the generator is supplied to the grid of the other inverter tube in such a manner that the combined effect of the signals causes the induction motor to operate in a direction and at a rate which is a function of the input signal.

Referring to the drawing more in detail the control signal is supplied by a lead 58 to the control grid 95 within an amplifier tube 96. The cathode 97 of the tube 96 is connected to one side of a potentiometer 98 having a variable tap 99 which is connected through a cathode biasing resistor 100 and a lead 101 to a source of biasing potential such as the −105 v. source. The anode 102 of the tube 96 is connected by a lead 103 to an impedance coupling network 104 comprising resistors 105, 106 and 107, thence by a lead 108 to the control grid 109 of an amplifier tube 110. The resistor 105 is connected by a lead 111 to a return lead 112 which in turn is connected by a lead 155 to a 90 v. lead 73. The resistor 107 is connected by a lead 113 to the resistor 100.

The tube 110 is shown as provided with a screen grid 115 which is connected by a lead 116 to the lead 112 and by the lead 155 to the 90 v. lead 73. The tube 110 is also provided with a cathode 125 connected to ground by a lead 126 and with an anode 117 which is connected by a lead 118 to the saturating winding 119 of a saturable core transformer 120 having a primary 121 and a secondary 122. The other side of the saturating winding 119 is connected by a lead 123 to a source of D. C. potential such as 300 v. source. A protective resistor 124 is shown as connected across the saturating winding 119.

An amplifier tube 130 has a cathode 131 connected by a lead 132 to the potentiometer 98, and has an anode 135 connected by a lead 136 to an impedance coupling network 137 comprising resistors 138, 139 and 140, thence by a lead 141 to the control grid 142 of an amplifier tube 143. The resistor 138 is connected to the lead 112 and thence by the lead 155 to the 90 v. lead 73. The resistor 140 is connected by a lead 144 to the resistor 100.

The amplifier tube 143 is provided with a cathode 150 connected by a lead 151 to ground. The screen grid 154 of the tube 143 is connected by a lead 155 to the lead 112 and to the 90 v. lead 73.

The anode 156 of the tube 143 is connected by a lead 157 to the saturating winding 158 of a second saturable core transformer 159 having a primary 160 and a secondary 161. The other side of the saturating winding 158 is connected to the lead 123 and thence to the 300 v. source. A protective resistor 162 is connected across the saturating winding 158.

Primaries 121 and 160 are supplied in series from a 110 v. 60 cycle source by mains 165 and 167. The main 165 is connected by a lead 166 to the primary 121, thence by a lead 168 to the primary 160, thence by a lead 169 to the alternating current supply main 167.

A two-phase induction motor 170 is shown as provided with a rotor 171, an energizing winding 172 and a control winding 173. The energizing winding 172 is connected across the alternating current supply mains 165, 167. The secondaries 122 and 161 of the saturable core transformers are connected in series opposition to the control winding 173 of the motor by means of leads 175, 176 and 177.

A condenser 178 connected across the secondaries 122 and 161 serves to maximize the power output of the reactor and at the same time shift the phase of the output voltage of the reactor into approximately a 90 degree phase relationship with the supply main. The reactor is so designed that the preceding conditions stated are possible.

The rotor 171 of the motor 170 is connected to a shaft 61. This shaft carries a D. C. generator 180 having an armature connected by brushes 181 and 182 and leads 183 and 184 to a resistor 185, a potentiometer 186 and a resistor 187 in series. The lead 184 is grounded at 188. The potentiometer 186 is provided with a variable tap 189 which is connected by a lead 190 to a contact 195 of a switch 196 which is connected by a lead 197 to the control grid 191 of the tube 130. A second contact 198 of the switch 196 is connected to a lead 199 which constitutes a second signal input.

In the operation of this device if the motor 170 is to be controlled as the function of an input signal supplied by the lead 58 to the control grid 95 of the tube 96, the contact 195 of the switch 196 is closed. The signal voltage is then supplied to the control grid 95 and introduces a corresponding variation in the plate current of the tube 96.

The amplifier tubes 96 and 130 and associated resistors 98 and 100 and networks 104 and 137 form an inverting and combining stage whose output is the amplified sum or difference of the error and feed-back input signals. The amplifier tubes 110 and 143 form a stage of amplification between the inverter and the saturable core transformers 120 and 159.

The amplifier tubes 110 and 143 control the saturating currents which pass through the windings 119 and 158 of the saturable core transformers 120 and 159. If the saturating current supplied to the transformer 120 is in balance with that supplied to the transformer 159 the voltages supplied by the secondaries 122 and 161 are balanced out and no resultant voltage is applied to the control winding 173 of the motor 170. If, however, the voltages in the secondaries 122 and 161 are unbalanced a resultant voltage is applied to the control winding 173 which causes the motor 170 to rotate in one direction or the other depending upon the phase of the applied voltage, and at a rate which is dependent upon the magnitude of the applied voltage.

The adjustments are made so that with a zero input signal on the grid 95 and a zero feed-back signal on the grid 191 the saturable core transformers 120 and 159 are in balanced relationship and zero control voltage is supplied to the control winding 173 of the motor 170. If now a plus or minus control signal is applied to the grid 95 the plate current in the tube 96 is altered in either a positive or negative direction with a corresponding change in the plate current in the tube 110 and the saturating current in the winding 119. The plate current in tube 96, flowing through the self-biasing resistor 100, varies the cathode potential of the tubes 96 and 130. Since the grid voltage of the tube 130 remains unaltered, the change in cathode bias due to the resistor 100 varies the plate current of the tube 130 in an opposite sense from the variation of the plate current in the tube 96, thereby producing a corresponding variation in the saturating current in the winding 158. The inverter stage thus produces an opposite change in the saturating currents to the two transformers 120 and 159 in response to a control signal on the grid 95.

The saturation of the two transformers 120, 159 thus becomes unbalanced and a resultant voltage is supplied to the control winding 173 of the motor 170 which causes the motor to operate.

The motor 170 drives the generator 180 and causes the latter to apply a voltage to the potentiometer 186 which is dependent upon the direction and speed of rotation of the generator. The voltage at the tap 189 is applied to the control grid 191 of the tube 130 of the inverter stage and produces an effect which opposes the effect of the input signal.

Assuming, for example, an input signal of ±9 v. range and that the amplifier network is adjusted so that an input signal of ±2 v. will cause the motor 170 to operate at full speed, it is evident that the motor 170 will operate at constant speed when the input signal is between ±2 v. and ±9 v. If the feed-back signal which is produced by the generator 180 is adjusted to a value of 7 v. at full generator speed, the difference between the input signal and the feed-back signal at full speed would amount to 2 v. which produces maximum torque on the motor 170. At any intermediate value of input signal the motor will drive the generator at a speed to produce maximum torque conditions, i. e. a 2 v. difference between input signal and feed-back signal. Hence the feed-back causes the motor 170 to operate at a variable speed which is a function of the input signal voltage. The voltages referred to above are illustrative only.

The value of the capacity 178 is such as to simultaneously produce a 90° phase relationship between the voltages in the windings 172 and 173 and to maximize the amplification of the reactor. The voltage in the winding 173 may lead or lag the voltage in the winding 172 dependent upon a plus or minus input signal. The feed-back from the generator 180 may be adjusted according to the speed at which the motor 170 is to operate.

The above described system may also be operated to drive the motor 170 in one direction or the other in response to an unbalance between two input signals. For this purpose the contact 198 of the switch 196 is closed, thereby rendering the feed-back circuit from the generator 180 inoperative. The two input signals are then supplied by the leads 58 and 199 to the respective grids 95 and 191. When these input signals are equal the secondary voltages of the saturable core transformers 120 and 159 are balanced and the motor 170 remains at rest. When, however, one or the other of the signals supplied to the leads 58 and 199 is increased or decreased with respect to the other signal, the system operates in the manner above described to unbalance the secondary voltages of the transformers 120 and 159 in a manner to cause the motor 170 to operate in one direction or the other depending upon the relative values of the input signals. In this event the speed of operation of the motor 170 will be a function of the unbalance between the input signals until the motor reaches maximum speed. If the input signals are in excess of the value required to cause the motor 170 to operate at full speed, the motor will of course continue to operate at full speed.

The above system provides a sensitive control means for reversibly controlling the operation of an induction motor in response to relatively small input signals. The system may for example be used as a signal follow-up in gyro-controlled follow-up systems or the like in which only a relatively small input signal is ordinarily available.

Athough a specific embodiment of the invention has been described, it is to be understood that the invention is capable of various uses and that changes and modifications may be made therein as will be readily apparent to a person skilled in the art. The invention is only to be restricted in accordance with the scope of the following claim.

What is claimed is:

A motor control system comprising a reversible motor having a control winding, a pair of saturable core transformers having secondary windings connected in opposition to said control winding for energizing said control winding in response to an unbalance of the voltages in said secondary windings, saturating windings on said transformers, a control channel connected to control the energization of said saturating windings and including an inverter stage comprising a pair of electronic amplifier tubes having their outputs connected respectively to control said saturating windings, having separate control grid leads and having cathodes connected to a common lead, a self-biasing resistor connected in the common cathode lead for causing mutual variation in an opposite sense and means supplying a control signal to the control grid of one of said tubes, a feed-back signal generator driven by said motor and generating a voltage which varies in amplitude and direction as a function of the generator speed, and means supplying the feed-back signal to the control grid of the other of said tubes to oppose the effect of said control signal and to cause the motor to operate at a speed which is a function of the amplitude of said control signal.

HENRY F. McKENNEY.
WILLIAM H. NEWELL.

REFERENCES CITED

The following references are of record in the file of this patent:

UNITED STATES PATENTS

| Number | Name | Date |
|---|---|---|
| 2,216,301 | Sparrow | Oct. 1, 1940 |
| 2,235,551 | Garman | Mar. 18, 1941 |
| 2,288,295 | Moyer et al. | June 30, 1942 |
| 2,346,838 | Haight | Apr. 18, 1944 |
| 2,414,430 | Nisbet | Jan. 14, 1947 |
| 2,435,926 | Krupick | Feb. 10, 1948 |